US006904556B2

(12) United States Patent
Walton et al.

(10) Patent No.: US 6,904,556 B2
(45) Date of Patent: Jun. 7, 2005

(54) SYSTEMS AND METHODS WHICH UTILIZE PARITY SETS

(75) Inventors: John K. Walton, Mendon, MA (US); Michael Bermingham, Framingham, MA (US); Christopher S. MacLellan, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 648 days.

(21) Appl. No.: 09/927,042

(22) Filed: Aug. 9, 2001

(65) Prior Publication Data

US 2003/0033572 A1 Feb. 13, 2003

(51) Int. Cl.[7] .............................................. G11C 29/00
(52) U.S. Cl. ...................... 714/766; 714/54; 714/763; 714/773; 714/805
(58) Field of Search .......................... 714/54, 763, 766, 714/773, 800, 805; G11C 29/00

(56) References Cited

U.S. PATENT DOCUMENTS

| 5,218,691 A | * | 6/1993 | Tuma et al. ................... 703/24 |
| 5,650,969 A | | 7/1997 | Niijima et al. ............... 365/200 |
| 5,862,158 A | | 1/1999 | Baylor et al. ............... 371/49.1 |
| 5,954,822 A | * | 9/1999 | Yashiro et al. ................. 714/6 |
| 2001/0039632 A1 | | 11/2001 | MacLaren et al. ............. 714/6 |
| 2002/0053010 A1 | | 5/2002 | Piccirillo et al. ........... 711/170 |

FOREIGN PATENT DOCUMENTS

| EP | 0 462 917 B1 | 9/1999 | ........... G06F/11/10 |
| WO | WO 9959157 A1 | * 11/1999 | ........... G11C/29/00 |
| WO | WO 02/29539 | 4/2002 | ............. G06F/3/06 |

OTHER PUBLICATIONS

Ng, S.W. and Mattson, R.L.; Uniform parity group distribution in disk arrays with multiple failures; Computers, IEEE Transactions on , vol.: 43 , Issue: 4 , Apr. 1994 pp.:501–506.*

Holland, M. et al.; Fast, on-line failure recovery in redundant disk arrays; Fault-Tolerant Computing, 1993. FTCS-23. Digest of Papers., The Twenty-Third International Symposium on , Jun. 22–24, 1993; pp.:422–431.*

Farid Neema, "Solid State Disks", Oct. 1997. pp. 1–2. Viewed on www.periconcepts.com on Nov. 2, 2004.

* cited by examiner

Primary Examiner—R. Stephen Dildine
(74) Attorney, Agent, or Firm—Chapin & Huang, L.L.C.; David E. Huang, Esq.

(57) ABSTRACT

A memory system and method of using same are provided. One embodiment of the system includes a semiconductor memory that is configured to include a multiplicity of memory segments. The memory segments are grouped into groups. Each of the groups includes N respective memory segments, where N is an integer number. In each respective group of memory segments, the N respective memory segments include respective data segments and a respective parity segment. Also in each respective group of memory segments, the respective parity segment in the respective group stores a respective data value P that may be calculated by a logical exclusive-or of respective data values stored in the respective data segments in the respective group.

18 Claims, 5 Drawing Sheets

SYSTEMS AND METHODS WHICH UTILIZE PARITY SETS

FIELD OF THE INVENTION

The present invention relates to a memory system (and method of using same) wherein a parity-based fault tolerance technique is employed.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network storage subsystem, manufactured and sold by the Assignee of the subject application (hereinafter "Assignee") under the tradename Symmetrix™ (hereinafter referred to as the "Assignee's conventional storage system"), includes a plurality of disk mass storage devices configured as one or more redundant arrays of independent (or inexpensive) disks (RAID). The disk devices are controlled by disk controllers (commonly referred to as "back end" controllers/directors) that store user data in, and retrieve user data from a shared cache memory resource in the subsystem. A plurality of host controllers (commonly referred to as "front end" controllers/ directors) may also store user data in and retrieve user data from the shared cache memory resource. The disk controllers are coupled to respective disk adapters that, among other things, interface the disk controllers to the disk devices. Similarly, the host controllers are coupled to respective host channel adapters that, among other things, interface the host controllers via channel input/output (I/O) ports to the network communications channels (e.g., SCSI, Enterprise Systems Connection (ESCON), and/or Fibre Channel (FC) based communications channels) that couple the storage subsystem to computer nodes in the computer network external to the subsystem (commonly termed "host" computer nodes or "hosts").

In the Assignee's conventional storage system, the shared cache memory resource may comprise a plurality of memory circuit boards that may be coupled to an electrical backplane in the storage system. The cache memory resource is a semiconductor memory, as distinguished from the disk storage devices also comprised in the Assignee's conventional storage system, and each of the memory boards comprising the cache memory resource may be populated with, among other things, relatively high-speed synchronous dynamic random access memory (SDRAM) integrated circuit (IC) devices for storing the user data. The shared cache memory resource may be segmented into a multiplicity of cache memory regions. Each of the regions may, in turn, be segmented into a plurality of memory segments.

In order to enhance the fault tolerance of the cache memory resource, it has been proposed to configure the cache memory resource to implement a conventional "dual write" fault tolerance scheme. According to this scheme, the cache memory resource is partitioned into two halves: a first half and a second half, respectively, with the total user data space being divided evenly between the two halves; each time user data is written into the cache memory resource (e.g., by a host controller or disk controller), one copy of that data is written to a portion of the first half of the cache memory, and a duplicate (i.e., redundant) copy of the user data is written to a corresponding portion of the second half of the cache memory. Thus, according to this scheme, the data stored in the first half of the cache memory exactly mirrors the data stored in the second half of the cache memory. In the absence of a failure of a portion of the cache memory resource, all requests to read user data from the resource may return data from the first half of the cache memory. However, if a portion of the first half of the cache memory fails, and it is desired to read user data that was stored in the failed portion, the user data may instead be read from the portion in the second half of the cache memory that corresponds to the failed portion.

In this proposed fault tolerance technique, at most only one half of the total user data space in the cache memory resource may be actually available for storing user data, since the second half of the cache memory resource is reserved solely for storing a redundant copy of the user data stored in the first half of the cache memory resource. This undesirably decreases the amount of the cache memory resource that is actually available for storing user data. Accordingly, it would be desirable to provide a cache memory fault tolerance technique that permits more of the cache memory resource to be actually available for storing user data than is possible in the prior art dual write technique.

SUMMARY OF THE INVENTION

The present invention provides a memory system and method of using same that are able to overcome the aforesaid and other disadvantages and drawbacks of the prior art. In one embodiment of the present invention, a cache memory system is provided that may be used to advantage in a network data storage system. The cache memory system of this embodiment may include a multiplicity of memory boards. Each of these boards may be or comprise a respective electrical printed circuit board or card. Each of the memory boards may have a respective multiplicity of semiconductor memory segments that together may comprise the user data space, and that may store respective data values. The segments may be grouped into parity sets or groups. Each of the parity sets or groups may include respective memory segments of number N, where N is an arbitrary integer. Depending upon the configuration of the memory system, the number N may be equal to 4.

The N respective memory segments in each respective parity set may include a respective parity segment and N-1 respective user data segments. The N respective segments in each respective parity set may be distributed among the memory boards such that none of the memory boards may have more than one respective memory segment from each respective parity set or group. That is, each memory board may have at most a single respective segment from any given parity set or group. At least one parity set or group (hereinafter "the at least one parity set") may include a respective parity segment that stores a respective data value P that may be calculated by performing an XOR (i.e., a logical bit-wise exclusive-or) of respective data values stored in the at least one parity set's respective data segments. For example, if the number N is equal to 4, and the respective data values stored in the respective data segments in the at least one parity set are equal to A, B, and C, respectively, then the respective data value P may be equal to A XOR B XOR C. Alternatively, each respective parity set or group may include a respective parity segment that may be calculated by an XOR of respective data values stored in the respective parity set's or group's respective data segments.

The cache memory system may include control circuitry that may be used to change the respective data values stored in the segments in the at least one parity set or group. A respective data value that may be initially stored in one respective data segment in the at least one parity set or group may be equal to a data value A; a respective data value that may be initially stored in the respective parity segment in that parity set or group may be equal to a data value P. When the control circuitry is used to change the one respective value from the value A to another data value A', the circuitry may also change the respective data value stored in the respective parity segment in the at least one parity set from the value P to another value P'. The value P' may be equal to P XOR A XOR A'. The control circuitry may be configured to make these changes to the respective data values stored in the respective parity segment and to the one respective data segment in the at least one parity set using atomic operations.

Each memory board may include a respective plurality of memory regions. Each memory region may include a respective subset of the memory segments included in the respective memory board or card that comprises the memory region. Each of the memory segments included in a respective memory region may be assigned a respective base memory address that may be different from other respective base memory addresses that may be assigned to other segments included in the respective memory region.

In this embodiment of the present invention, if a data segment in a parity set fails, the data value that was stored in failed data segment may be reconstructed using the data values stored in the non-failed data segments and the parity segment in the parity set to which the failed data segment belongs. For example, if a given parity set contains a total of three data segments and one parity segment, the failed data segment stored a data value A, and the two non-failed data segments and the parity segment store values B, C, and P, respectively, then the data value A that was stored in the failed data segment may be reconstructed based upon the following relationship:

A=P XOR C XOR B, assuming that P=A XOR B XOR C in accordance with this embodiment of the present invention.

Advantageously, in contradistinction to a memory system that utilizes the aforesaid conventional dual write technique, in the improved fault tolerant memory system of the present invention, significantly more than 50 percent of the total user data space may be available for storing user data. For example, in an improved fault tolerant cache memory system made according to the above-described embodiment of the present invention, the maximum percentage of the total cache memory that may be actually available for storing user data may be selected by setting the value of N, and depending upon the value chosen for N, may be significantly higher than 50 percent. For example, if N equals 4, then such maximum percentage may be equal to 75 percent.

These and other features and advantages of the present invention, and various embodiments thereof, will become apparent as the following Detailed Description proceeds and upon reference to the Figures of the drawings, wherein like numerals depict like parts, and in which:

Although the following Detailed Description will proceed with reference being made to illustrative embodiments and methods of use of the present invention, it should be understood that it is not intended that the present invention be limited to these illustrative embodiments and methods of use. On the contrary, many alternatives, modifications, and equivalents of these illustrative embodiments and methods of use will be apparent to those skilled in the art. For example, although the subject invention will be described as being used to advantage in connection with a cache memory system in a network data storage subsystem, the subject invention may be used in connection with other types of memory systems. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
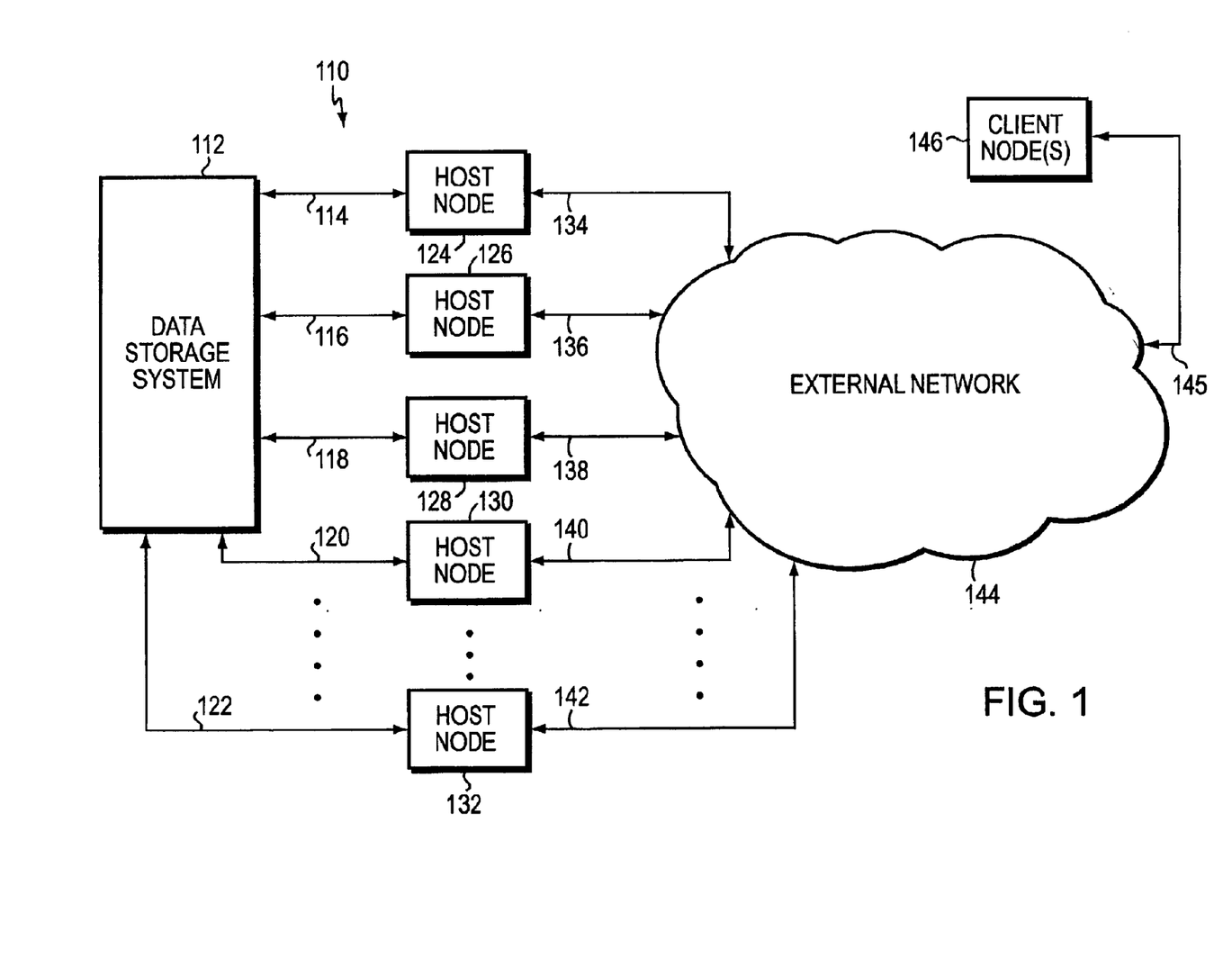
FIG. 1 is a high-level schematic block diagram of a data storage network that includes a data storage system wherein one embodiment of the present invention may be practiced to advantage.

Turning now to FIGS. 1–5, illustrative embodiments of the present invention will be described. FIG. 1 is a high-level block diagram illustrating a data storage network 110 that includes a data storage system 112 wherein one embodiment of the subject invention may be practiced to advantage. System 112 is coupled via communication links 114, 116, 118, 120, . . . 122 to respective host computer nodes 124, 126, 128, 130, . . . 132. Each of the communication links 114, 116, 118, 120, . . . 122 may be configured for communications involving a respective conventional network communication protocol (e.g., FC, ESCON, SCSI, Fibre Connectivity, etc.). Host nodes 124, 126, 128, 130, . . . 132 are also coupled via additional respective conventional network communication links 134, 136, 138, 140, . . . 142 to an external network 144. Network 144 may comprise one or more Transmission Control Protocol/Internet Protocol (TCP/IP)-based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134, 136, 138, 140, . . . 142, and 145 are selected so as to ensure that the nodes 124, 126, 128, 130, . . . 132 may exchange data and commands with the nodes 146 via network 144.

Host nodes 124, 126, 128, 130, . . . 132 may be any one of several well-known types of computer nodes, such as server computers, workstations, or mainframes. In general, each of the host nodes 124, 126, 128, 130, . . . 132 and client nodes 146 comprises a respective computer-readable memory (not shown) for storing software programs and data structures associated with, and for carrying out the functions and operations described herein as being carried by these nodes 124, 126, 128, 130, . . . 132, and 146. In addition, each of the nodes 124, 126, 128, 130, . . . 132, and 146 further includes one or more respective processors (not shown) and network communication devices for executing these software programs, manipulating these data structures, and for permitting and facilitating exchange of data and commands among the host nodes 124, 126, 128, 130, . . . 132 and client nodes 146 via the communication links 134, 136, 138, 140, . . . 142, network 144, and links 145. The execution of the software programs by the processors and network communication devices included in the hosts 124, 126, 128, 130, . . . 132 also permits and facilitates exchange of data and commands among the nodes 124, 126, 128, 130, . . . 132 and the system 112 via the communication links 114, 116, 118, 120, . . . 122, in the manner that will be described below.

Figure 2:
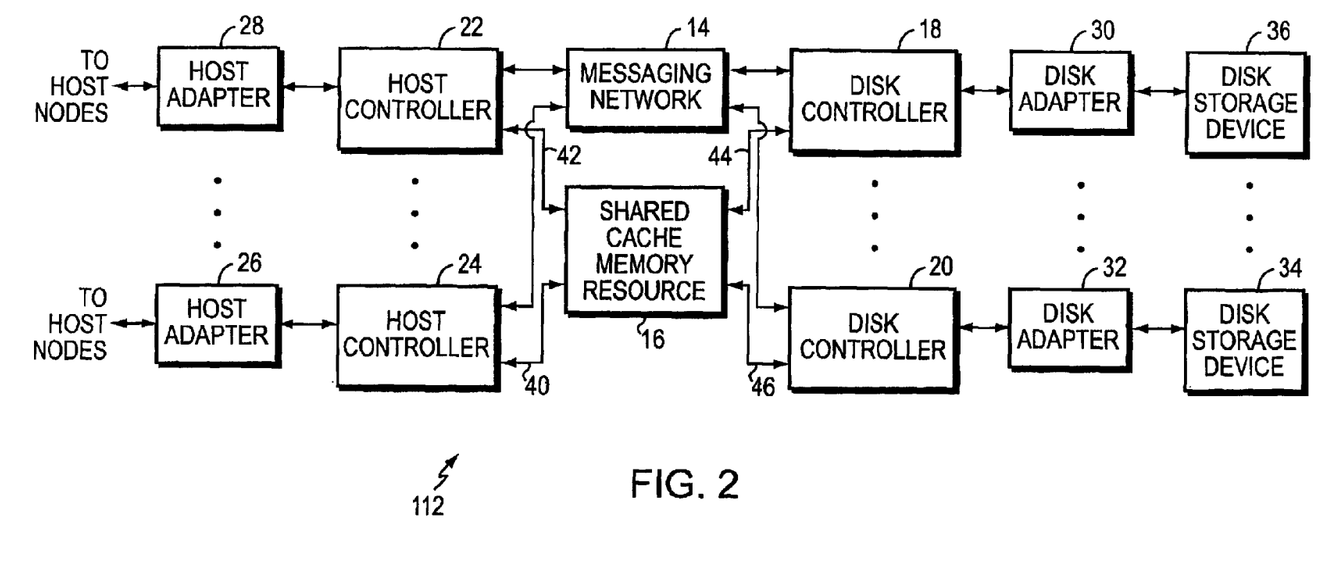
FIG. 2 is a high-level schematic block diagram illustrating functional components of the data storage system included in the data storage network shown in FIG. 1.

FIG. 2 is a high-level schematic block diagram of functional components of the system 112. System 112 includes a plurality of host adapters 26 . . . 28, a plurality of host controllers 22 . . . 24, a message network or system 14, a shared cache memory resource 16, a plurality of disk controllers 18 . . . 20, a plurality of disk adapters 30 . . . 32, and sets of disk storage devices 34 . . . 36. In system 112, the host controllers and disk controllers are coupled to individual memory boards (See FIGS. 3 and 4) comprised in the cache memory 16 via a point-to-point data transfer network system that comprises a plurality of network links. For example, host controllers 22 and 24 are coupled to the cache memory resource 16 via respective pluralities of point-to-point data transfer network links 42 and 40 comprised in the point-to-point data transfer network system. Similarly, the disk controllers 18 and 20 are coupled to the cache memory resource 16 via respective pluralities of point-to-point data transfer network links 44 and 46 comprised in the point-to-point data transfer network system.

In this embodiment of system 112, although not shown explicitly in the Figures, depending upon the particular communication protocols being used in the respective links 114, 116, 118, 120, . . . 122, each host adapter 26 . . . 28 may be coupled to multiple respective host nodes. For example, in this embodiment of system 112, if the links 114, 116, 118, 120 are FC communication links, adapter 26 may be coupled to host nodes 124, 126, 128, 130 via links 114, 116, 118, 120, respectively. It should be appreciated that the number of host nodes to which each host adapter 26 . . . 28 may be coupled may vary, depending upon the particular configurations of the host adapters 26 . . . 28, and host controllers 22 . . . 24, without departing from this embodiment of the present invention. In network 110, host adapter 26 provides network communication interfaces via which the host controller 24 may exchange data and commands, via the links 114, 116, 118, 120, with the host nodes 124, 126, 128, 130, respectively.

Each host controller 22 . . . 24 may comprise a single respective circuit board or panel. Likewise, each disk controller 18 . . . 20 may comprise a single respective circuit board or panel. Each disk adapter 30 . . . 32 may comprise a single respective circuit board or panel. Likewise, each host adapter 26 . . . 28 may comprise a single respective circuit board or panel. Each host controller 22 . . . 24 may be electrically and mechanically coupled to a respective host adapter 28 . . . 26, respectively, via a respective mating electromechanical coupling system.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of magnetic and/or optical disk mass storage devices.

It should be appreciated that the respective numbers of the respective functional components of system 112 shown in FIG. 2 are merely for illustrative purposes, and depending upon the particular application to which the system 112 is intended to be put, may vary without departing from the present invention. It may be desirable, however, to permit the system 112 to be capable of failover fault tolerance in the event of failure of a particular component in the system 112. Thus, in practical implementation of the system 112, it may be desirable that the system 112 include redundant functional components and a conventional mechanism for ensuring that the failure of any given functional component is detected and the operations of any failed functional component are assumed by a respective redundant functional component of the same type as the failed component.

The general manner in which data may be retrieved from and stored in the system 112 will now be described. Broadly speaking, in operation of network 110, a client node 146 may forward a request to retrieve data to a host node (e.g., node 124) via one of the links 145 associated with the client node 146, network 144 and the link 134 associated with the host node 124. If data being requested is not stored locally at the host node 124, but instead, is stored in the data storage system 112, the host node 124 may request the forwarding of that data from the system 112 via the FC link 114 associated with the node 124.

The request forwarded via link 114 is initially received by the host adapter 26 coupled to that link 114. The host adapter 26 associated with link 114 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may forward a message, via the messaging network 14, to the disk controller (e.g., controller 18) associated with the storage devices 36 within which the requested data is stored, requesting that the disk controller 18 retrieve the requested data into the cache 16.

In response to the message forwarded from the host controller 24, the disk controller 18 may forward via the disk adapter 30 to which it is coupled appropriate commands for causing one or more of the disk devices 36 to retrieve the requested data. In response to such commands, the devices 36 may forward the requested data to the disk controller 18 via the disk adapter 30, and the disk controller 18 may transfer via one or more of the links 44 the requested data for storage in the cache 16. The disk controller 18 may then forward via the network 14 a message advising the host controller 24 that the requested data has been stored in the cache 16.

In response to the message forwarded from the disk controller 18 via the network 14, the host controller 24 may retrieve the requested data from the cache 16 via one or more of the links 40, and may forward it to the host node 124 via the adapter 26 and link 114. The host node 124 may then forward the requested data to the client node 146 that requested it via the link 134, network 144 and the link 145 associated with the client node 146.

Additionally, a client node 146 may forward a request to store data to a host node (e.g., node 124) via one of the links 145 associated with the client node 146, network 144 and the link 134 associated with the host node 124. The host node 124 may store the data locally, or alternatively, may request the storing of that data in the system 112 via the link 114 associated with the node 124.

The data storage request forwarded via link 114 is initially received by the host adapter 26 coupled to that link 114. The host adapter 26 associated with link 114 may then forward the data storage request to the host controller 24 to which it is coupled. In response to the data storage request forwarded to it, the host controller 24 may then initially transfer, via one or more of the links 40, the data associated with the request for storage in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

Additional details concerning the features and operation of system 112 may be found in e.g., commonly-owned, U.S. Pat. No. 6,636,933, entitled, "Data Storage System Having Crossbar Switch With Multi-Staged Routing," filed Dec. 21, 2000; this Application is hereby incorporated by reference herein in its entirety.

Figure 3:
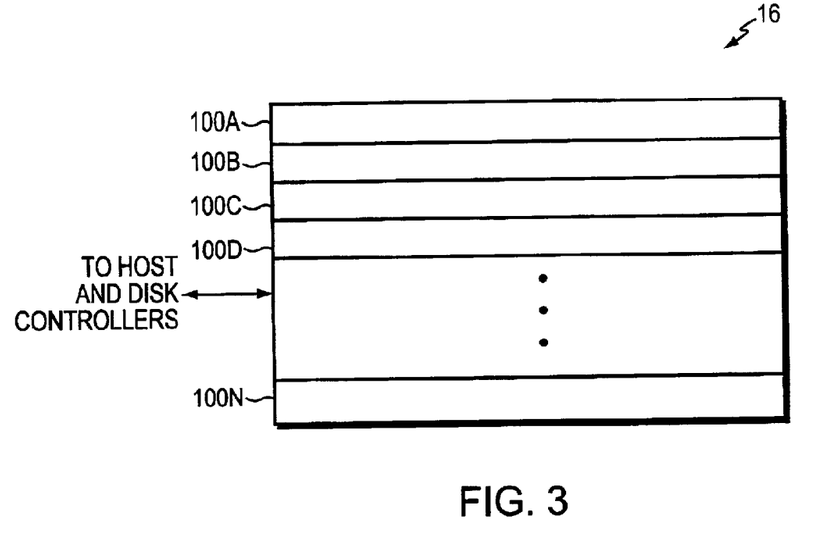
FIG. 3 is a high-level schematic block diagram illustrating functional components of the shared cache memory resource in the data storage system of FIG. 2.
Figure 4:
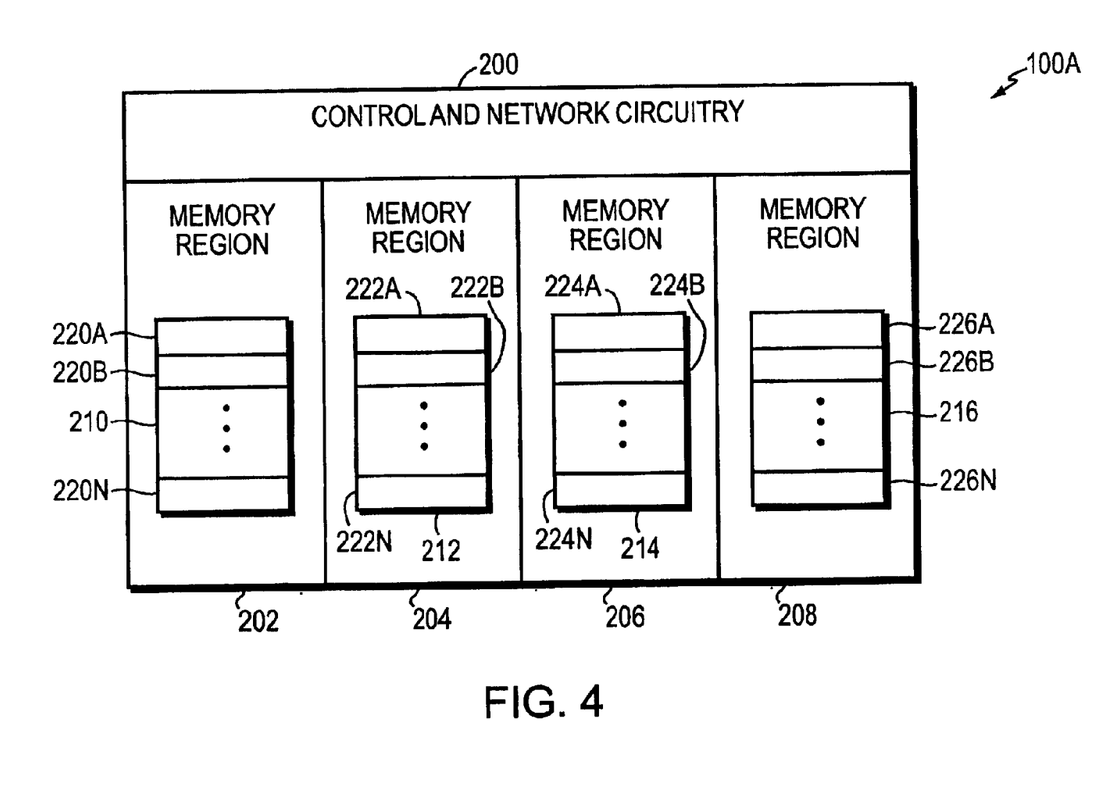
FIG. 4 is a high-level schematic block diagram illustrating functional components of a memory board that may be comprised in the shared cache memory resource of FIG. 3.
Figure 5:
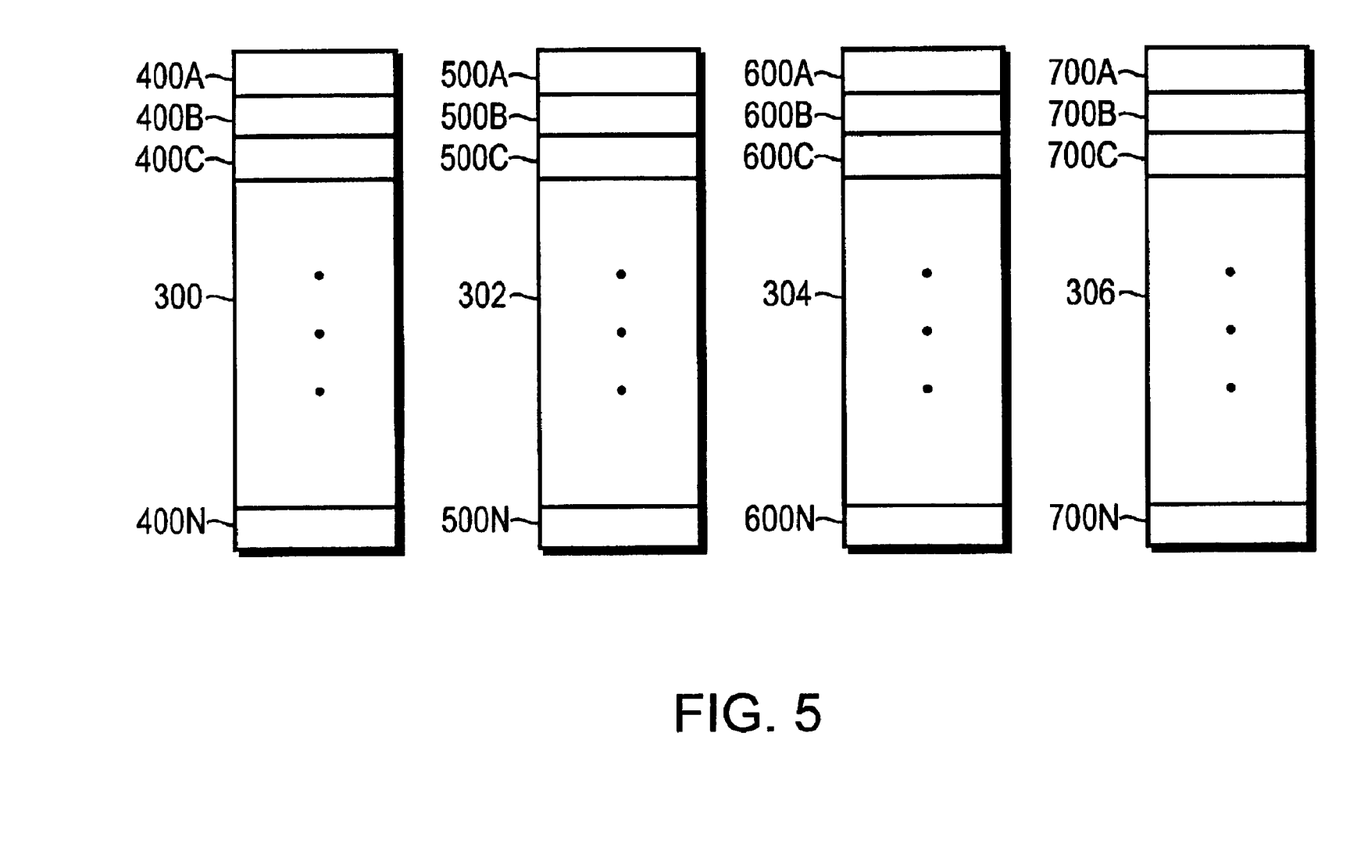
FIG. 5 is a high-level schematic block diagram for use in facilitating description of aspects of one embodiment of the present invention.

With particular reference being made to FIGS. 3–5, illustrative embodiments of the present invention that may be used to advantage in the cache memory system 16 of the system 112 will now be described. Memory system 16 comprises a plurality of electrical circuit boards or cards 100A, 100B, 100C, 100D . . . 100N that may be coupled to an electrical backplane (not shown) in system 112. When coupled to this backplane, the memory boards 100A, 100B, 100C, 100D . . . 100N may become electrically connected via electrical circuit traces in the backplane to other components of system 112, such that the boards 100A, 100B, 100C, 100D . . . 100N may communicate and interact with each other and the host and disk controllers in system 112 in the manner described herein. It is important to note that the number of memory boards shown in FIG. 3 is merely illustrative, and depending upon the configuration of the system 112, the actual number of memory boards that may be comprised in the system 112 may vary. The construction and operation of each of the memory boards 100A, 100B, 100C, 100D . . . 100N are essentially identical; accordingly, in order to avoid unnecessary duplication of description, the construction and operation of one memory board 100A are described herein.

FIG. 4 is a high-level logical schematic representation of pertinent functional components of memory board 100A. Board 100A comprises control and network circuitry 200, and a plurality of memory regions 202, 204, 206, and 208. Each of the memory regions 202, 204, 206, and 208 comprises a respective plurality of banks of SDRAM IC devices. For example, region 202 comprises a plurality of banks of SDRAM IC devices (collectively referred to by numeral 210); region 204 comprises a plurality of banks of SDRAM IC devices 212; region 206 comprises a plurality of banks of SDRAM IC devices 214; and, region 208 comprises a plurality of banks of SDRAM IC devices 216. The respective pluralities of SDRAM IC devices comprised in each of the banks 210, 212, 214, and 216 are configured so as to comprise respective pluralities of memory segments of predetermined size (e.g., 256 megabytes each) in memory system 16. In this embodiment of the present invention, each of the memory segments may have a different base memory address independent of the other memory segments within the same memory region. More specifically, the SDRAM IC devices in memory banks 210 are configured so as to comprise memory segments 220A, 220B, . . . 220N; the SDRAM devices in memory banks 212 are configured so as to comprise memory segments 222A, 222B, . . . 222N; the SDRAM devices in memory banks 214 are configured so as to comprise memory segments 224A, 224B, . . . 224N; and, the SDRAM devices in memory banks 216 are configured so as to comprise memory segments 226A, 226B, . . . . 226N. It should be noted that the respective number of memory regions comprised in board 100A, as well as, the numbers and sizes of the memory segments comprises in such regions may vary without departing from this embodiment of the present invention. For example, in this embodiment of the present invention, the memory regions may comprise respective integer numbers of memory segments that may vary between 2 and 64, inclusive.

In each respective memory segment, the data stored therein may be further segmented into respective pluralities of 64-bit data words. Individual data words may be grouped into stripe units of 64 words each, and the stripe units may be striped across the respective memory regions in each respective memory board.

It should be appreciated that each of the SDRAM IC devices comprised in the cache 16 is a semiconductor memory device, and these SDRAM IC devices may be used by the cache 16 to store user data forwarded to the cache 16 from the host controllers and the disk controllers in system 112, as well as, parity related data, in accordance with this embodiment of the present invention. Accordingly, the cache memory system 16 is a semiconductor memory system, as distinguished from the disk storage devices 34 . . . 36 comprised in the system 112, and the memory regions and memory segments comprised in the memory system 16 are semiconductor memory regions and semiconductor memory segments, respectively.

In general, control and network circuitry 200 comprises logic network and control logic circuitry (not shown) that may facilitate, among other things, exchange of data and commands among the memory regions 202, 204, 206, and 208 and the host controllers and disk controllers via the links 40, 42, 44, and 46. More specifically, the control logic circuitry in circuitry 200 may include memory region controllers that may control, among other things, the storing of data in and retrieval of data from the memory regions 202, 204, 206, and 208. The logic network circuitry in the circuitry 200 may include crossbar switching and associated point-to-point network circuitry (hereinafter referred to as "crossbar switching circuitry") and serial-to-parallel converter circuitry. The serial-to-parallel converter circuitry may be configured to convert serial streams of information (e.g., comprising data, address information, commands, cyclical redundancy check information, signaling semaphores, etc.) received from the host controllers and disk controllers via the links 40, 42, 44, and 46 into corresponding parallel streams of information, and to forward the parallel streams of information to the crossbar switching circuitry. The serial streams of information may also contain "tag" information indicating, among other things, the memory board in the cache 16 and the memory region in that memory board where the data is to be stored/read, the host or disk controller that initiated the data transfer associated with the data, etc. The serial-to-parallel converter circuitry may also be configured to convert parallel streams of information received from the crossbar switching circuitry to corresponding serial streams of information for forwarding to appropriate host and disk controllers via the links 40, 42, 44, and 46 associated with such appropriate controllers.

The crossbar switching circuitry may include a crossbar switch network and an associated point-to-point network. This point-to-point network may include a plurality of point-to-point interconnections or links that may couple respective ports of the crossbar switch network to respective ports of the memory region controllers. The crossbar switch network may be configured to receive the parallel information from the serial-to-parallel converter circuitry, and to forward the received information, based upon the contents of that information, via an appropriate point-to-point interconnection in the point-to-point network in board 100A to a port of an appropriate memory region controller (e.g., a memory region controller associated with a memory region in board 100A specified in the received parallel information).

Each memory region controller may issue commands, responsive to the information that it receives via the point-to-point network in board 100A, to a respective one (e.g., region 202) of the memory regions 202, 204, 206, and 208 with which it is associated. These commands may cause, among other things, the region 202 to store data in the memory banks 210, or to retrieve stored data from the memory banks 210. Such retrieved data may be forward by the memory region controller, via the point-to-point network in the board 100A to the crossbar switch network, and thence through the serial-to-parallel converter circuitry, to an appropriate host or disk controller via one of the links 40, 42, 44, and 46.

Although not shown in Figures, it should be noted that, in actual implementation of board 100A, portions of the circuitry 200 may be distributed in the regions 202, 204, 206, and 208 (e.g., circuitry for providing relatively low level commands/signals to actual SDRAM IC devices in the region, such as, chip select, clock synchronization, memory addressing, data transfer, memory control/management, clock enable signals, etc.), however, for purposes of the present discussion, this circuitry may be thought of as being logically comprised in the circuitry 200. Further details and description of the types and functions of circuitry 200 that may be distributed in the regions 202, 204, 206, and 208 in actual implementation of board 100A may be found in e.g., commonly-owned, U.S. Pat. No. 6,554,511, filed Feb. 28, 2001, entitled "Error Condition Handling" said Application is hereby incorporated herein by reference in its entirety.

FIG. 5 is a high-level schematic block diagram for use in facilitating description of this embodiment of the present invention. In FIG. 5, all of the memory segments 400A, 400B, 400C, . . . 400N comprised in all of the memory regions 202, 204, 206, and 208 in memory board 100A are referred to collectively by numeral 300. In other words, memory segments 400A, 400B, 400C, . . . 400N comprise all of the memory segments (i.e., memory segments 220A, 220B, . . . 220N; 222A, 222B, . . . 222N; 224A, 224B, . . . 224N; and 226A, 226B, . . . 226N) described as being in board 100A, and these memory segments 400A, 400B, 400C, . . . 400N are referred to collectively in FIG. 5 by numeral 300. Also in FIG. 5, all of the memory segments 500A, 500B, 500C, . . . 500N comprised in all of the memory regions in memory board 100B are referred to collectively by numeral 302. Likewise, all of the memory segments 600A, 600B, 600C, . . . 600N comprised in all of the memory regions in memory board 100C are referred to collectively by numeral 304; and, all of the memory segments 700A, 700B, 700C, . . . 700N comprised in all of the memory regions in memory board 100D are referred to collectively by numeral 306.

In accordance with this embodiment of the present invention, the host controllers, disk controllers, and the respective control and network circuitry in the respective memory boards 100A, 100B, 100C, 100D, . . . 100N may be configured to implement a fault tolerance/data protection technique wherein each of the memory segments in each of the memory boards 100A, 100B, 100C, 100D, . . . 100N may be associated with other memory segments in a respective parity set or group, such that, among other things, each of the parity sets or groups may include the same respective integer number N of memory segments, and no two of the memory segments in a respective parity set or group may be comprised in the same respective memory board. Thus, in this embodiment of the present invention, if the number N of respective memory segments in each respective parity set is equal to 4 and parity sets are to be formed using the segments 300, 302, 304, and 306, then each parity segment may include a first respective memory segment selected from the memory segments 300 comprised in memory board 100A, a second respective memory segment selected from the memory segments 302 comprised in memory board 100B, a third respective memory segment selected from the memory segments 304 comprised in memory board 100C, and a fourth respective memory segment selected from memory segments 306 comprised in memory board 100D. Thus, in accordance with this illustrative embodiment, a first parity set may comprise memory segments 400A, 500A, 600A, and 700A, a second parity set may comprise memory segments 400B, 500B, 600B, and 700B, a third parity set may comprise memory segments 400C, 500C, 600C, and 700C, and the other memory segments comprised in segments 300, 302, 304, and 306 may be assigned to parity sets in accordance with this pattern.

Each parity set may comprise a single respective parity segment and N-1 respective data segments. The respective parity segments and respective data segments in the respective parity sets may be selected such that the respective parity sets' respective parity segments are substantially equally distributed among the memory boards whose memory segments are comprised in the parity sets. Thus, in this embodiment of the present invention, in the parity set that includes segments 400A, 500A, 600A, and 700A, segment 400A may be a parity segment and segments 500A, 600A, and 700A may be data segments; in the parity set that includes segments 400B, 500B, 600B, and 700B, segment 500B may be a parity segment, and segments 400B, 600B, and 700B may be data segments; in the parity set that includes segments 400C, 500C, 600C, and 700C, segment 600C may be a parity segment, and segments 400C, 500C, and 700C may be data segments, and the other memory segments comprised in segments 300, 302, 304, and 306 may be chosen to be parity segments or data segments in accordance with this pattern.

The respective parity segment and respective data segments in each respective parity set may store respective data values. In each respective parity set, the respective data value that may be stored in the respective parity segment may be equal to a logical XOR of respective data values stored in respective data segments in the parity set. The respective data values that may be stored in the respective data segments may be respective user data values written into the respective data segments in response to commands received by the memory system 16 from host and/or disk controllers in the system 112. Thus, for purposes of illustration, if the memory segments 400A, 500A, 600A, and 700A store data values P, A, B, and C, respectively, then the data value P may be equal to A XOR B XOR C.

The respective control and network circuitry in the memory boards 100A, 100B, 100C, 100D, ... 100N and/or other components of the system 112 (e.g., the host and disk controllers) may maintain a mapping of the respective parity sets in memory 16, which mapping may indicate the respective locations and number of memory segments comprised in the respective parity sets. Such circuitry may be configured to generate and store, in accordance with an initialization scheme (and/or in response to received host or disk controller commands), initial respective data values in respective parity segments in the respective parity sets. For example, in such an initialization scheme, the data value A may be read from the memory segment 500A and forwarded to the control and network circuitry 200 in board 100A in series of multiple data word transfers. The circuitry 200 may temporarily store the value A in the segment 400A. The data value B may also be read out from the segment 600A and transmitted to the control and network circuitry 200 in series of multiple data word transfers. The circuitry 200 may XOR (using not shown XOR logic circuitry comprised in the circuitry 200) the received data words from value B with the corresponding data words in the value A temporarily stored in the segment 400A, and replace the value A with the results of these XOR operations (i.e., A XOR B). In other words, the circuitry 200 performs the operation A XOR B on a data word by data word basis, and stores the results thereof in the segment 400A. The data value C may then be read out from the segment 700A and transmitted to the control and network circuitry 200 in series of multiple data word burst. The circuitry 200 may XOR the received data words from value C with the corresponding data words stored in segment 400A, and store the results of these XOR operations as the value P in segment 400A.

Thereafter, when a data value is written (e.g., in response to host or disk controller commands) to a data segment in a respective parity set, a data value must also be written to the parity segment in the respective parity set to ensure that the data value stored in the parity segment satisfies the above logical relationship among the data values stored in the memory segments in the respective parity set. For example, if the memory segment 700A is written to, such that the data value C stored in segment 700A is changed to C', then the data value P stored in memory segment 400A must also be changed to a new data value (e.g., P'), with P' being equal to A XOR B XOR C'.

In order to accomplish this, for each data word in the data value C' that has changed relative to the data value C, a respective set of atomic operations may be performed. Each set of atomic operations may include a first atomic operation and a second atomic operation that may be performed during respective data transfer cycles in the memory 16. That is, for each respective data word in value C' that differs from the respective corresponding data word in value C, a respective set of the atomic operations may be performed.

For example, if a data word (hereinafter termed "the changed data word") in the value C' is different from its corresponding data word in the value C, in the first of these memory operations, XOR logic circuitry comprised in the control and network circuitry in board 100D may be used to calculate a partial parity value that may be equal to an XOR of the changed data word with the changed data word's corresponding data word in the value C, and the partial parity value may be forwarded to the control and network circuitry in board 100A. In the second of these memory operations, the XOR logic circuitry comprised in circuitry 200 may perform an XOR of the partial parity value and the data word in value P stored in the segment 400A that corresponds to the changed data word, and may write the results of this latter XOR operation in the location in segment 400A in which the corresponding data word from P is stored. If additional data words are present in the value C' that are different from their respective corresponding data words in the value C, the above process may be repeated for each of these additional data words, and at the end of such additional iterations of this process (if any), the value stored in segment 400A will be P', since, although in the interest of brevity such will not be undertaken here, it can be shown mathematically that

A XOR B XOR C'=P XOR C XOR C'=P'.

The control and network circuitry in the memory boards may comprise a bi-directional data path that may permit the changed data word in the value C' to be written to the segment 700A simultaneously with the generation and forwarding of the partial parity value. Advantageously, this may permit the number of data transfer cycles, and therefore, also the time required to perform a memory write operation in this embodiment of the present invention to be significantly reduced (e.g., so as to be equal to that required to perform a write operation involving the same amount of data in a memory that utilizes a dual write fault tolerance technique).

Also in accordance with this embodiment of the present invention, the control and network circuitry comprised in the memory boards 100A, 100B, 100C, 100D ... 100N (and/or other components in system 112, e.g., the host and disk controllers) may be configured to detect (e.g., using conventional memory failure detection techniques) when failure of one of the data segments in a parity set has occurred. When such failure is detected, the respective control and network circuitry comprised in appropriate ones of the memory boards 100A, 100B, 100C, 100D ... 100N may be used to reconstruct the data value that was stored in the failed data segment using the data values stored in the non-failed data segments and the parity segment in the parity set to which the failed data segment belongs, and may store the reconstructed data value into another memory segment that has not failed. For example, if failure of the memory segment 500A is detected, the control and network circuitry 200 in the memory board 100A may be used to forward (e.g., in series of multiple data word transfers) the value P stored in memory segment 400A for use by the control and network circuitry in board 100D; the control and network circuitry in memory board 100D may use the logical XOR circuitry comprised in the control and network circuitry in board 100D to logically XOR the received data words from the value P with the corresponding data words in the value C (e.g., to perform the operation P XOR C in a data word by data word fashion), and may temporarily store the data value (hereinafter referred to as "data value X") resulting from these XOR operations in another memory segment (e.g., 700N) in memory 16 that is currently available for data storage. The control and network circuitry comprised in memory board 100C may forward (e.g., in series of multiple data word transfers) for use by the control and network circuitry in memory board 100D the data value B stored in memory segment 600A; the control and network circuitry in memory board 100D may then use its logical XOR circuitry to logically XOR the received data words from the data value B with the corresponding data words from the value X (i.e., to perform the operation X XOR B in a data word by data word fashion), and to forward the resulting value (which is equal to the data value A that was stored in failed segment 500A) for storage in a memory segment that is not located in memory boards 100A, 100C, or 100D and is available to store data. For example, if only segment 500A in board 100B has failed, the board 100B is otherwise operating normally, and the segment 500N is available to store data, the newly reconstructed value A may be stored in segment 500N. Alternatively, if it is desired not to store the newly reconstructed value A in the memory board 100B that comprises the failed segment 500A, the reconstructed value A may be stored in e.g., an available data segment in memory board 100N. The particular memory segments in which the data value X and the reconstructed value A may be stored, may also vary without departing from this embodiment of the present invention.

It is important to note that the value A may be reconstructed on a failed data word-by-data-word basis. That is, if fewer than all of the data words comprised in the segment 500A have failed, then only those failed data words need to be reconstructed. For example, if only the first data word (e.g., the least significant data word) of the segment 500A fails, then only the respective corresponding first data words in the values P, B, and C need be used to mathematically reconstruct that failed first data word. The reconstructed data word may then be combined in the other non-failed data words from segment 500A to produce the value A, which value A may then be stored in an available data segment (e.g., 500N or unavailable data segment in board 100N).

Portions of the respective control and network circuitry of the respective memory boards 100A, 100B, 100C, 100D . . . 100N may be embodied as application-specific integrated circuits (and related circuitry) that may be preprogrammed with specific algorithms whose execution may permit the respective control and network circuitry to be able to carry out the procedures, processes, techniques, operations, and functions that are described above as being carried by such control and network circuitry.

Thus, it is evident that there has been provided, in accordance with the present invention, a memory system and method of using same that fully satisfy the aims and objectives, and achieve the advantages, hereinbefore set forth. The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed.

For example, although illustrative embodiments of the present invention have been described in connection with use in a network data storage system that comprises a messaging network 14 that facilitates communications between the host controllers and the disk controllers, and a point-to-point data transfer network system that comprises links 40, 42, 44, and 46, if appropriately modified, these embodiments of the present invention may instead be used in connection with other types of network data storage systems, e.g., that utilize a redundant busy system of the type described in commonly-owned, U.S. Pat. No. 6,554,551, filed Feb. 28, 2001, entitled "Error Condition Handling".

Other modifications are also possible. For example, certain write-modify-read memory operations may be implemented in the system 16, and these operations may be adapted for compatibility with the present invention. Examples of such write-modify-read operations may include operations (such as, compare and swap, addition of half or full words/bytes, etc.) by which arithmetic and/or logical memory operations may be performed upon a data word previously stored in a memory segment (e.g., segment 500A) memory 16, the results of these operations may be used to overwrite the location in memory where the data word previously was stored, and the previously stored data word may be returned. These operations may be carried out such that, when the previously stored data word is returned, XOR logic circuitry (e.g., comprised in the control and network circuitry in the memory board in which the operation is carried out) may generate and include with the returned data value an extra data word that may be the XOR of previously stored data word and the results of the logical/arithmetic operations. The returned data value may be used, in the manner described above, in changing the value P to P' in the parity segment 400A in the parity set to which the segment 500A belongs.

Other modifications are also possible. Accordingly, the present invention should be viewed broadly as encompassing all modifications, variations, alternatives and equivalents as may be encompassed by the hereinafter appended claims.

What is claimed is:

1. A memory system, comprising:

a plurality of memory boards, each of the memory boards having a respective plurality of memory segments that may store respective data values, the segments being grouped into parity sets such that each of the parity sets includes respective segments of number N, the number N being an integer, the N respective segments in each respective parity set including a respective parity segment and N-1 respective data segments, the N respective segments in each respective parity set being distributed among the memory boards such that none of the memory boards has more than one respective segment from each respective parity set, and a respective data value stored in a respective parity segment in at least one parity set may be calculated by a logical exclusive-or of respective data values stored in respective data segments in the at least one parity set, wherein:

each memory board includes a respective plurality of memory regions, each memory region includes a respective subset of the segments included in a respective memory board, and each of the segments included in a respective memory region may be assigned a respective base memory address different from other respective base memory addresses that may be assigned to other segments included in the respective memory region.

2. The memory system of claim 1, wherein:

the number N is equal to 4.

3. The memory system of claim 1, wherein:

the number N is equal to 4;

a respective data value initially stored in one respective data segment in the at least one parity set is equal to variable value A, and a respective data value initially stored in the respective parity segment in the at least one parity set is equal to variable value P;

the memory system includes circuitry that may be used to change the respective data values stored in the segments in the at least one parity set; and when the circuitry is used to change the one respective data value from the variable value A to another variable value A', the circuitry also changes the respective data value stored in the respective parity segment in the at least one parity set from a variable value P to another variable value P', the value P' being equal to P XOR A XOR A', where "XOR" represents a logical exclusive-or function.

4. The memory system of claim 3, wherein the circuitry is configured to change, in respective atomic operations, the one respective data value and the respective data value stored in the respective parity segment in the at least one parity set.

5. The memory system of claim 1, wherein the memory boards comprise semiconductor memory, and each respective plurality of memory segments is comprised in the semiconductor memory.

6. A memory system, comprising:

a plurality of semiconductor memory segments, the segments being grouped into groups, each of the groups including N respective semiconductor memory segments, the number N being an integer, the N respective segments in each respective group comprising respective data segments and a respective parity segment; and in each of the groups:

the respective parity segment stores a respective data value P that may be calculated by a logical exclusive-or of respective data values stored in the respective data segments, wherein:

the segments reside in memory regions of a memory board, and each of the segments included in a respective memory region may be assigned a respective base memory address different from other respective base memory addresses that may be assigned to other segments included in the respective memory region.

7. The memory system of claim 6, wherein the plurality of memory segments are distributed among a plurality of electrical circuit boards such that none of the circuit boards includes more than one respective segment from each respective group.

8. The memory system of claim 7, wherein:

the number N is equal to 4; and in each of the groups:

the value P stored in the respective parity segment is equal to A XOR B XOR C, where A, B, and C are respective data values stored in the respective data segments, where "XOR" represents a logical exclusive-or function.

9. The memory system of claim 6, further comprising:

circuitry that may be used to implement an atomic operation by which one data value stored in one of the data segments in one of the groups may be changed from a first data value A to a second data value A', the circuitry also being usable to implement another atomic operation that changes to a data value P' the respective data value P stored in the respective parity segment in the one of the groups, the value P' being equal to P XOR A XOR A', where "XOR" represents a logical exclusive-or function.

10. A method of using a memory system, the memory system including a plurality of memory boards, each of the memory boards having a respective plurality of memory segments that may store respective data values, the method comprising:

grouping the segments into parity sets such that each of the parity sets includes respective segments of number N, the number N being an integer, the N respective segments in each respective parity set including a respective parity segment and N-1 respective data segments;

distributing the N respective segments in each respective parity set among the memory boards such that none of the memory boards has more than one respective segment from each respective parity set; and storing in a respective parity segment in at least one parity set a respective data value that may be calculated by logically exclusive-or-ing together respective data values stored in respective data segments in the at least one parity set, wherein:

each memory board includes a respective plurality of memory regions;

each memory region includes a respective subset of the segments included in a respective memory board; and each of the segments included in a respective memory region may be assigned a respective base memory address different from other respective base memory addresses that may be assigned to other segments included in the respective memory region.

11. The method of claim 10, wherein:

the number N is equal to 4.

12. The method of claim 10, wherein:

the number N is equal to 4;

a respective data value initially stored in one respective data segment in the at least one parity set is equal to variable value A, and a respective data value initially stored in the respective parity segment in the at least one parity set is equal to variable value P; and the method further comprises:

changing the one respective data value from the variable value A to another variable value A'; and changing the respective data value stored in the respective parity segment in the at least one parity set from a variable value P to another variable value P', the value P' being equal to P XOR A XOR A', where "XOR" represents a logical exclusive-or function.

13. The method of claim 12, wherein the changing of the one respective data value and the changing of the respective data value stored in the respective parity segment in the at least one parity set are executed in atomic operations.

14. The method of claim 10, wherein the memory boards comprise semiconductor memory, and each respective plurality of memory segments is comprised in the semiconductor memory.

15. A method of using a memory system, the system comprising a plurality of semiconductor memory segments, the method comprising:

grouping the segments into groups, each of the groups including N respective semiconductor memory segments, the number N being an integer, the N respective segments in each respective group comprising respective data segments and a respective parity segment; and storing, in the respective parity segment in each of the groups, a respective data value P that may be calculated by logically exclusive-or-ing together respective data values stored in the respective data segments, wherein:

the segments reside in memory regions of a memory board of the system, and each of the segments included in a respective memory region may be assigned a respective base memory address different from other respective base memory addresses that may be assigned to other segments included in the respective memory region.

16. The method of claim 15, wherein the method further comprises distributing the plurality of memory segments among a plurality of electrical circuit boards such that none of the circuit boards includes more than one respective segment from each respective group.

17. The method of claim 15, wherein:

the number N is equal to 4; and in each of the groups, the value P stored in the respective parity segment is equal to A XOR B XOR C, where A, B, and C are respective data values stored in the respective data segments, where "XOR" represents a logical exclusive-or function.

18. The method of claim 15, wherein the method further comprises:

executing an atomic operation that causes one data value stored in one of the data segments in one of the groups to be changed from a first data value A to a second data value A', and also executing another atomic operation that changes to a data value P' the respective data value P stored in the respective parity segment in the one of the groups, the value P' being equal to P XOR A XOR A', where "XOR" represents a logical exclusive-or function.

* * * * *